Oct. 28, 1941.    D. BRASSEUR    2,260,431
CARBURETING DEVICE
Filed Nov. 8, 1940
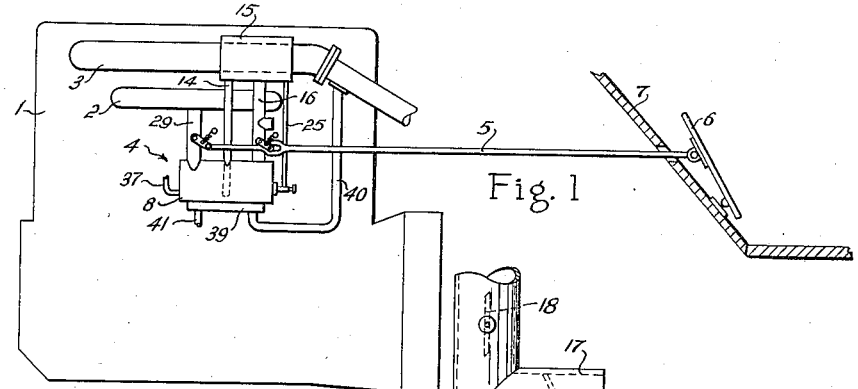
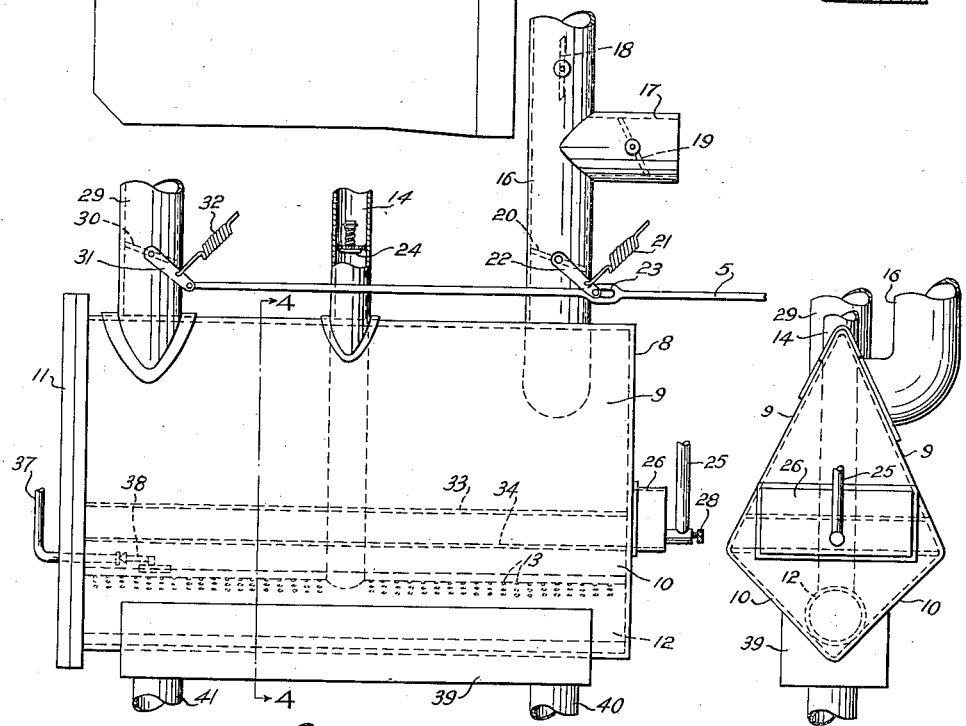
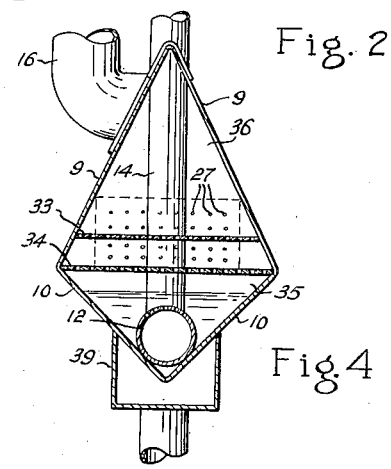
INVENTOR:
DONAT BRASSEUR
BY Alex E. MacRae
ATTORNEY.

Patented Oct. 28, 1941

2,260,431

UNITED STATES PATENT OFFICE 2,260,431

CARBURETING DEVICE

Donat Brasseur, Windsor, Ontario, Canada, assignor of thirty-five per cent to William J. Henderson, Windsor, Ontario, Canada Application November 8, 1940, Serial No. 364,811

4 Claims. (Cl. 261—47)

This invention relates to carburetors for internal combustion engines, and this application is a continuation-in-part of application Serial No. 330,829, filed April 22, 1940. The invention has for an object the provision of a carbureting device of simplified structure adapted to conserve fuel and promote economy in the operation of internal combustion engines.

Another object of the invention is the provision, in an internal combustion engine, of a carbureting device adapted to deliver a mixture of fuel and a controlled amount of air in accordance with the requirements of the engine for efficient operation during starting operations and for varying speeds thereof. Another object is the provision of means for partially or wholly vaporizing the fuel in said mixture.

A further object is the provision, in an internal combustion engine, of a carbureting device including means for forcing air through a supply of liquid fuel to form a mixture of fuel particles and air, means for vaporizing the fuel particles, and means responsive to the speed control means of the engine for supplying a controlled quantity of air to the mixture of vaporized fuel and air.

With the foregoing and other objects in view, the invention will be more fully described with particular reference to the accompanying drawing, in which:

Figure 1 is a diagrammatic view of the carbureting device of the present invention applied to an internal combustion engine;

Figure 2 is a side elevation of the device;

Figure 3 is an end elevation, and

Figure 4 is a section on line 4—4 of Figure 2.

Referring to Figure 1 of the drawing, I indicates an internal combustion engine having an intake manifold 2 and an exhaust manifold 3; 4 is the carbureting device of the present invention and 5 is an accelerating rod connected to the device and to an accelerator pedal 6 mounted on the floor boards 7 of a vehicle in which the engine may be installed.

The device 4, with particular reference to Figures 2, 3 and 4, includes a somewhat elongated container 8, prismatic in shape and having two relatively wide upper side walls 9 converging to an apex and two relatively narrow lower side walls 10 converging downwardly to their meeting point. For assembly purposes, the container is formed with an open end provided with a cover 11.

Extending longitudinally from end to end of the container and resting on the walls 10 at the bottom thereof is a tube 12 having a multiplicity of perforations 13 in the top portion thereof. A conduit 14 having therein a simple poppet valve 24 provides communication between the interior of tube 12 and an air heating stove 15 mounted on the exhaust manifold 3. The stove 15 is of usual type and consists of a cylindrical casing surrounding a portion of the exhaust manifold and having air inlets (not shown) for supplying fresh air thereto to be heated.

A second air pipe 16, of somewhat larger diameter than the conduit 14, is adapted to provide communication between the upper portion of the container adjacent the apex and the air stove and, through a branch inlet 17, with the atmosphere. Manually adjustable and operable valves 18 and 19 are located respectively in the branch pipe 17 and in the portion of pipe 16 leading to the stove. A butterfly valve 20 is provided in the pipe 16 adjacent its entrance to the container and is urged towards closed position by a spring 21 connected to the valve operating lever 22. This lever is actuatable by the accelerator rod 5 and has a lost motion connection 23 therewith.

A third communicating passage comprising a relatively small conduit 25 is provided between the air stove and the container. The outlet of the conduit 25 into the container is provided with an air distributing means comprising a small compartment 26 into which the conduit leads and which is mounted on the end wall of the container at a point lying between the lower portion of the side walls 9. The compartment communicates with the interior of the container by means of a plurality of perforations 27 in the container end wall. A valve 28 adjusts the supply of air passing through conduit 25.

The fuel mixture produced in the container is fed to the intake manifold 2 through a pipe 29, leading from the apex of the container. The usual throttle valve 30, with actuating lever 31 and closing spring 32, is provided, the lever being connected to the accelerator rod 5 in the ordinary manner.

A pair of horizontally extending partitions 33 and 34, spaced a short distance apart, divides the container into two main chambers, a lower fuel chamber 35 and an upper fuel mixture chamber 36. The partitions comprise perforated plates, one being located at the meeting edges of walls 9 and walls 10 and the other slightly above this point.

Liquid fuel, such as gasoline, is supplied to the chamber 35 by a conduit 37, the outlet of which is controlled by a suitable float valve arrangement 38 to maintain a constant level of fuel in the chamber. The preferable level is slightly above the top of tube 12 and somewhat below the partition 33.

A heating jacket 39 is mounted on the bottom portion of the container and is supplied with hot exhaust gases from the exhaust manifold by the pipe 40 leading into one end of the jacket. An outlet pipe 41, which may be open to the atmosphere, is provided at the other end of the jacket.

In operation, with the engine cold and throttle partly open, actuation of the engine starter induces a high degree of vacuum in the intake manifold and the chamber 36 is thus subjected to suction. Valve 20 being closed, the suction opens poppet valve 24 and air is drawn through conduit 14 into tube 12, from whence it passes out through the perforations 13 and bubbles up through the gasoline. It then passes up through the perforated plates 33 and 34 into the upper chamber 36. In its passage through the liquid fuel, the air picks up a sufficient quantity of gasoline particles to form an explosive mixture of gasoline and air. The perforated plates 33 and 34 assist in uniformly mixing and distributing the gasoline particles and air. A small quantity of air is added to the mixture through the conduit 25. Since only a limited and controlled amount of air is supplied to the container through the valve in pipe 14 and the small conduit 25, an extremely rich fuel mixture is produced to facilitate starting of the engine.

With the engine running at low speeds, a sufficient quantity of air, controlled by adjustment of the valves 24 and 28, is supplied to the container through pipes 14 and 25 to produce an efficient fuel mixture.

It will be observed that, by virtue of the lost motion connection between the accelerator rod and the valve operating lever 22, valve 20 remains closed at low speed or partly open position of the throttle valve 30. As the throttle is opened still further and the speed increased, the lost motion in the connection 23 is entirely taken up and the valve 20 opened by the accelerator rod an amount directly proportional to the additional opening movement of the throttle and, therefore, the speed of the engine. It may be stated that, generally speaking, opening movement of valve 20 would begin at an engine speed corresponding to a vehicle speed of from 20 to 25 miles per hour.

The additional air supplied through pipe 16 serves to maintain a proper and efficient fuel-air ratio at varying speeds of the engine. Air entering the container through pipe 16 also serves to create further turbulence in the fuel-air mixture thus tending to break up to a greater extent the fuel particles therein.

As the engine heats up, hot air is supplied by the air stove 15 to the pipes 16, 14 and 25 and the heating jacket 39 applies heat to the gasoline chamber. Complete or partial vaporization of the raw gasoline particles in the gasoline-air mixture is thereby effected and a highly efficient and economical fuel mixture produced for engine operation.

Under some climatic conditions, it may be advisable to supply fresh atmospheric air, or a mixture of fresh and heated air, to the container through pipe 16, and this may be accomplished, as desired, by manually setting valves 18 and 19 as required.

The conduit 25, it will be observed, is adapted to supply a constant small quantity of air sufficient for idling purposes of the engine.

The container 8 is shaped to accomplish most efficient operation of the device. The fuel chamber 35, being triangular in cross-section, conveniently receives between its converging sides the air distributing tube 12. The jacket 39, of simple shape, is readily applied to the bottom whereby it supplies heat to both walls of the chamber. Moreover, a relatively small quantity of fuel is necessary in the chamber and thus heating thereof is simplified.

The mixture chamber 36, being also triangular in cross-section, has a restricted apex portion to receive and maintain the concentrated fuel mixture. The air supply pipe 16 discharges into the chamber at one end thereof and somewhat below this restricted apex portion whereby a most efficient mixing of the fuel and air is effected before the mixture leaves the chamber through the outlet 29 leading directly from the apex portion at the other end of the chamber.

Various changes may be made in the device described without departing from the spirit of the invention. Thus, other control means responsive, for instance, to engine vacuum, may be substituted for the accelerator rod-controlled means for adjusting the valve 20.

I claim:

1. In an internal combustion engine having an intake manifold, a carbureting device comprising a liquid fuel chamber, means for maintaining a constant level of fuel in said chamber, a fuel mixture chamber in communication with the fuel chamber, a fuel mixture conduit leading from said mixture chamber to the intake manifold, a throttle valve in said fuel mixture conduit, an accelerator rod for actuating said throttle valve, means for feeding a supply of primary air to said device comprising an air conduit having a discharge orifice in said fuel chamber below the level of the fuel therein, a suction-actuated valve in said air conduit for controlling said air supply, means for feeding an auxiliary supply of air to said device comprising a second air conduit having a discharge orifice in said mixture chamber above the level of the fuel, a valve in said second conduit for controlling said auxiliary air supply, said valve being normally closed, and means including a lost motion connection with said accelerator rod for opening said normally closed valve only after a predetermined opening movement of said throttle valve.

2. In an internal combustion engine having an intake manifold, a carbureting device comprising a liquid fuel chamber, means for maintaining a constant level of fuel in said chamber, a fuel mixture chamber in communication with the fuel chamber, a fuel mixture conduit leading from said mixture chamber to the intake manifold, a throttle valve in said fuel mixture conduit, and means for feeding a supply of primary air to said device comprising an air conduit having a discharge orifice in said fuel chamber below the level of the fuel, a valve in said air conduit controlling said air supply, resilient means urging said valve into closed position, said valve having an opening movement effective against said closing means and governed in extent by the degree of vacuum existing in said mixture chamber, means for feeding a supply of secondary air to said device comprising a second air conduit having a discharge orifice in said mixture chamber above the level of the fuel, a valve in said second conduit for controlling said secondary air supply, said valve being normally closed, and means effective only after a predetermined opening movement of said throttle valve for opening said normally closed valve.

3. In an internal combustion engine having an intake manifold, a carbureting device comprising a liquid fuel chamber, means for maintaining a constant level of fuel in said chamber, a fuel mixture chamber in communication with the fuel chamber, a fuel mixture conduit leading from said mixture chamber to the intake manifold, a throttle valve in said fuel mixture conduit, an accelerator rod for actuating said throttle valve, means for feeding a supply of primary air to said device comprising an air conduit having a discharge orifice in said fuel chamber below the level of the fuel, a valve in said air conduit controlling said air supply, resilient means urging said valve into closed position, said valve having an opening movement effective against said closing means and governed in extent by the degree of vacuum existing in said mixture chamber, means for feeding an auxiliary supply of air to said device comprising a second air conduit having a discharge orifice in said mixture chamber above the level of the fuel, a normally closed valve in said second conduit for controlling said auxiliary air supply, and means including a lost-motion connection with said accelerator rod for opening said normally closed valve only after a predetermining opening movement of said throttle valve.

4. In an internal combustion engine as defined in claim 1 having an exhaust manifold, air heating means mounted on said exhaust manifold and deriving heat therefrom, said air conduits being connected with said air heating means to receive heated air therefrom, said second air conduit also having an inlet for fresh atmospheric air, and means in said second conduit for controlling the quantity of heated air and of fresh atmospheric air received in said conduit.

DONAT BRASSEUR.